United States Patent [19]

Rubin

[11] 4,435,836
[45] Mar. 6, 1984

[54] TECHNIQUE FOR EXTRACTING FEATURES FROM IMAGES

[75] Inventor: Steven M. Rubin, Los Altos, Calif.

[73] Assignee: Bell Telephone Laboratories, Incorporated, Murray Hill, N.J.

[21] Appl. No.: 311,791

[22] Filed: Oct. 15, 1981

[51] Int. Cl.³ .............................................. G06K 9/12
[52] U.S. Cl. ........................................ 382/27; 382/25
[58] Field of Search ................... 382/27, 24, 25, 41, 382/56

[56] References Cited

U.S. PATENT DOCUMENTS

| | | | |
|---|---|---|---|
| 4,183,013 | 1/1980 | Agrawala | 382/25 |
| 4,193,056 | 3/1980 | Morita | 382/25 |
| 4,224,600 | 9/1980 | Sellner | 382/41 |
| 4,242,734 | 12/1980 | Deal | 382/25 |
| 4,281,312 | 7/1981 | Knudson | 382/27 |
| 4,379,283 | 4/1983 | Ito | 382/27 |

*Primary Examiner*—Howard W. Britton
*Attorney, Agent, or Firm*—Barry H. Freedman

[57] ABSTRACT

Attributes or features of a portion of a picture are represented by one or more strokes which are formed using special purpose hardware and a processing algorithm which operates in a hypothesize-and-test mode. Each assumed stroke is tested using parallel processing, and the test result is used to determine the next hypothesis. A minimum of information is maintained indicating prior test results.

15 Claims, 18 Drawing Figures

TECHNIQUE FOR EXTRACTING FEATURES FROM IMAGES

BACKGROUND OF THE INVENTION

1. Field of the Invention

This invention relates generally to picture processing and, in particular, to a technique for extracting features called "strokes" with predefined characteristics from images.

2. Description of the Prior Art

When a machine, such as a computer, is required to "intelligently" process an image, the image must first be converted into an internal representation with which the machine can deal effectively. The conversion is necessary to reduce the very large amount of information which represents the image to a more manageable size, and generally involves specifying the picture attributes in terms of one or more features each having predefined characteristics. Typically, the internal representation is orders of magnitude more compact than the original image, advantageously reducing the time and space required for the machine to process the image. Examples of the features used to represent attributes of a picture include descriptions and plans of its edges, skeletons and regions. Another feature of interest is called a stroke, which is defined herein to include a rectangular area in the picture having a uniform visual characteristic (e.g. intensity). Strokes are useful in many picture processing tasks, including optical character recognition.

Known techniques for reducing images to internal forms by extraction of features such as strokes are generally slow, since the large amount of information describing the individual elements of the picture must be processed one by one, in a predetermined sequence. Most processing techniques are "data directed", requiring a memory to store a large amount of state information which specifies previous test results. In addition, while some special purpose hardware has been designed to improve the feature extraction process by parallel processing, complex algorithms are often necessary to enable processing using general purpose hardware.

In view of the foregoing, it is the broad object of the present invention to enable extraction of features with predefined characteristics, particularly strokes, from an image using special purpose hardware and a processing algorithm that is efficient and easy to implement.

SUMMARY OF THE INVENTION

In accordance with the present invention, a block of data representing the attributes of a portion of the image being processed is cached or stored in a memory and one or more features such as strokes describing the stored information are identified using a hypothesize-and-test technique. In stroke extraction, a seed picture element within the cache is located and a first assumption made as to the characteristics of the stroke being sought. The assumption is tested, using parallel processing, and an indication of success or failure of the test is formed. In each succeeding step, the result of the previous test is used to determine the next hypothesis. However, the new hypothesis is tested as a whole, rather than picture element by picture element. Only a small amount of information must be maintained, indicating which of the strokes tested has the largest area.

BRIEF DESCRIPTION OF THE DRAWING

The present invention will be better appreciated by consideration of the following detailed description when read in light of the accompanying drawing in which.

DETAILED DESCRIPTION

Figure 1:
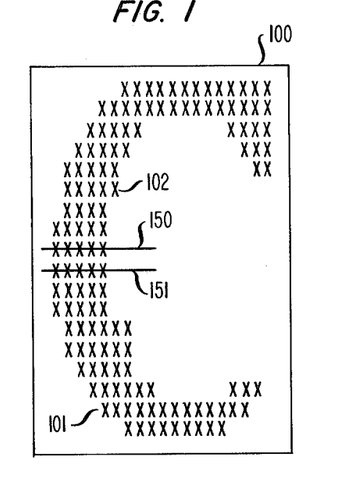
FIG. 1 is an illustration of a portion of an image which is to be processed in order to extract features which describe its attributes.

An image to be processed may be a monochrome, continuous tone or color picture comprised of a plurality of picture elements (pels). The pels form a rectilinear array, each lying along one of a series of generally parallel scan lines. For a monochrome picture, the visual attributes of each pel are represented by an associated bit (1 or 0) indicating the status or state of that element. Each pel can reside in one of two states, sometimes referred to as on/off, black/white, or energized/deenergized, etc. For gray level and color pictures, each pel can be represented by a multibit word which specifies its visual attributes, such as intensity, luminance/chrominance, etc. In FIG. 1, rectangle 100 indicates the boundaries of a portion of an image, which for simplicity is assumed to be monochrome. The X's represent pels that are "on" and the unmarked spaces represent "off" pels. The pels lie along scan lines, such as lines 150, 151.

One feature that may be extracted from the image of FIG. 1 is called a "stroke" which is, in this example, a rectangular patch of pels in the "on" state. More generally, a stroke is defined as a contiguous group of picture elements having similar attributes. Each stroke includes at least one seed pel (described below) in one of its corners; for each seed pel, the stroke having the largest area (product of the width and height) is the one being sought. A seed pel is characterized by at least two neighboring pels in the "off" state which abut the seed pel along orthogonal edges. Seed pels can be identified by scanning the image to examine the four neighbors (top, bottom, left and right) for each "on" pel. When at least two diagonally opposite neighboring pels are "off", a seed pel has been located.

Figure 2:
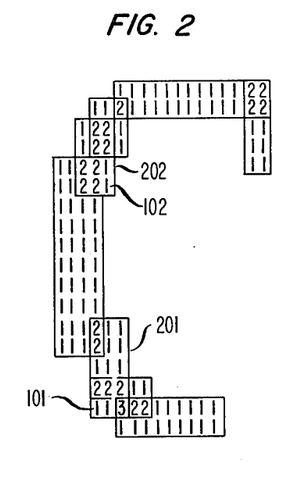
FIG. 2 illustrates features called "strokes" which describe the image of FIG. 1.
Figure 3:
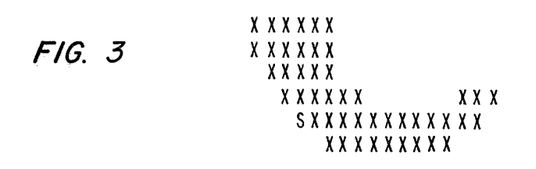
FIGS. 3, 4, 5, 6 and 7 indicate several steps in the procedure used to extract one of the strokes shown in FIG. 2.

The foregoing definitions are illustrated in FIGS. 1 and 2, in which pel 101 is a seed pel, since the pels to its left and beneath it are both "off". One stroke of which seed pel 101 is a part is outlined by rectangle 201 of FIG. 2 and has a width of three pels and a height of five pels. Numerals are used rather than X's to denote "on" pels in FIG. 2, with the numeral indicating how many strokes each pel is a part of. Pel 102 of FIG. 1 is also a seed pel (since pels to its right and bottom are also off) and a stroke which includes this seed is stroke 202 in FIG. 2, having an area of 12 pels (width 3 by height 4).

Figure 4:
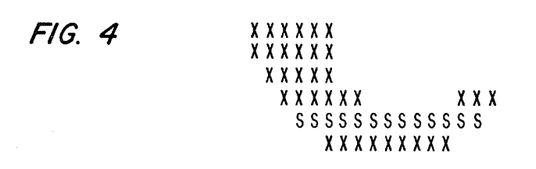
Figure 5:
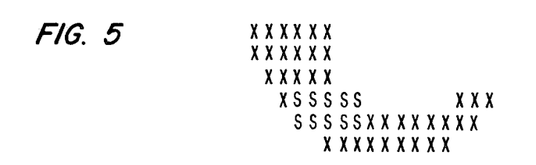
Figure 6:
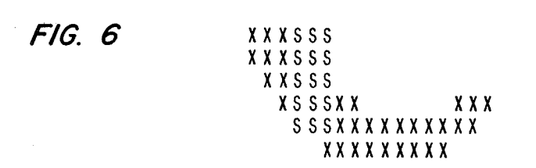
Figure 7:
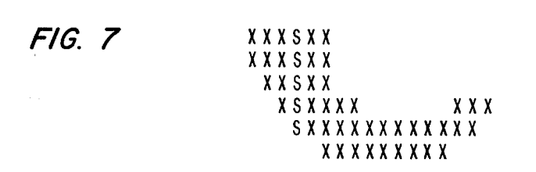

A small portion of the image of FIG. 1 is repeated in FIGS. 3 through 7 in order to explain the technique used in accordance with the present invention to extract a stroke such as stroke 201. The process begins with seed pel 101, which is shown as the letter S in FIG. 3. Initially, the stroke is extended to its maximum width in the horizontal direction as shown in FIG. 4 where S's again represent the stroke being extracted as it has been tentatively configured. Once the stroke has been extended horizontally, it is "grown" in the vertical direction. Each attempt to grow the stroke vertically is tested to determine if a "valid" stroke exists, i.e., if all of the pels in the newly hypothesized stroke are indeed "on". If so, a further attempt at vertical growth is tested. When an invalid stroke is found, a "record" is kept of the area of the last (most recent) valid stroke, the width of the stroke is narrowed by one pel, and the process repeated. Thus, in FIG. 5, a valid stroke has been identified (after eight unsuccessful vertical growth steps) as having a width of five pels and a height of two pels. The narrowing proceeds (after two more steps) as in FIG. 6 wherein the valid stroke is three pels wide and five pels high. Finally (two steps later), a valid stroke includes a single column, as in FIG. 7, having a height of five pels. During the process described above, each hypothesized stroke was tested as a whole. The area of each valid stroke was "remembered" in order to identify the stroke having the maximum area, i.e., the greatest product of width times height. In this example, the stroke in FIG. 6 represents the maximum area of 15 pels and is the desired feature to be extracted from the image being processed. This stroke corresponds to stroke 201 of FIG. 2.

Figure 8:
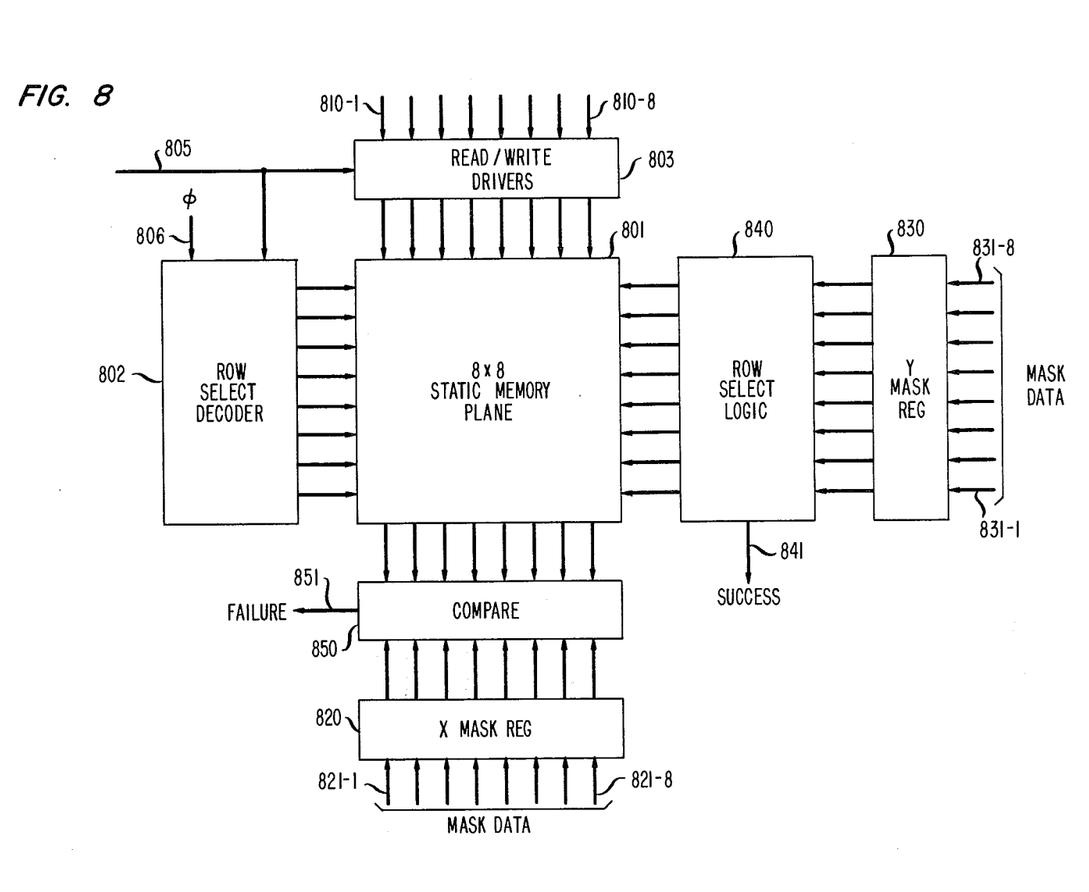
FIG. 8 is a block diagram of one embodiment of apparatus in accordance with the present invention used in extracting features from an image.

FIG. 8 illustrates, in block diagram form, one embodiment of a stroke extraction apparatus arranged in accordance with the present invention. At the heart of the apparatus is a two-dimensional memory 801 which may be a random access memory, arranged to store a portion of the image being processed. In the example described above, the image being processed is monochrome, so a single bit represents the attributes (state) of each pel, and a one-bit 8-row-by-8-column memory plane is shown. However, it is to be understood that multiple planes (or memories capable of storing multibit words at each memory "location") would be used where the attributes of each picture element are represented by a multibit word.

Transfer of the image information into and out of memory 801 is accomplished one row at a time, under control of a row select decoder 802 and read/write drivers 803, both of which are usually associated with input/output operations on random access memories. Decoder 802 may be a shift register which is preset by a write signal applied on line 805 and which is sequentially advanced by a clock signal applied on line 806 so as to select successive rows in memory 801. Read/write drivers 803 are also enabled for writing by an input on line 805. Each time decoder 802 is advanced, an entire row of picture information applied on lines 810-1 through 810-8 is entered in the selected row within memory 801. In this way, after eight clock pulses on line 806, the entire memory plane is loaded with information describing the attributes of the portion of the picture being processed.

Also included in the apparatus of FIG. 8 are X mask and Y mask registers 820 and 830, respectively, which receive mask words from inputs 821-1 through 821-8 and 831-1 through 831-8, respectively. These mask words are generated in a manner to be discussed hereinafter and specify the region or portion of the image within memory 801 that is to be examined in each "test" step to determine the presence of a "hypothesized" stroke. Each of the X and Y masks consists of a word having the same number of bits as the number of columns and rows, respectively, in the portion of the image being processed. In this example, the masks are each 8-bit words, having "1's" in certain locations. The intersection of these locations define the area of the picture examined during the test. For example, if the mask inputs on lines 831-1, 831-2, 821-1 and 821-2 are high, a 4-pel region in the lower lefthand corner of memory plane 801 is examined to determine the presence of a hypothesized stroke. A "valid" hypothesis exists if all 4 pels in the region are in the "on" state. Similarly, if the inputs on lines 831-5 through 831-8 and 821-1 through 821-4 are high, the stored pels representing the attributes of the upper lefthand quadrant of the picture are examined.

In the process used to test the validity of each hypothesized stroke, row select logic 840 sequentially uses each "1" bit in the Y mask to select a corresponding row of memory 801. The stored bits in the selected row are compared with the X mask, using an 8-bit comparator circuit 850. If one or more "1's" in the X mask do not have corresponding "1's" in the row selected, a failure signal is generated on line 851 indicating an invalid hypothesis. Otherwise, the "1" bit in the Y mask corresponding to last selected row is set to "0", and the row select logic is advanced to select the row corresponding to the next "1" bit in the Y mask. The foregoing process starts with the first "1" bit in the Y mask and is thereafter repeated for each of the rows specified by "1's" in the Y mask. If, at any step, a failure is indicated by an output on line 851, the hypothesized stroke being tested has been found to be invalid, and the next hypothesis is tested. When all of the rows specified by the Y mask have been tested successfully, register 830 contains all "0's", and a success output is generated by select logic 840 on line 841, indicating that the hypothesized stroke is valid. The next hypothesis may then be tested, using different X or Y masks.

Figure 10:
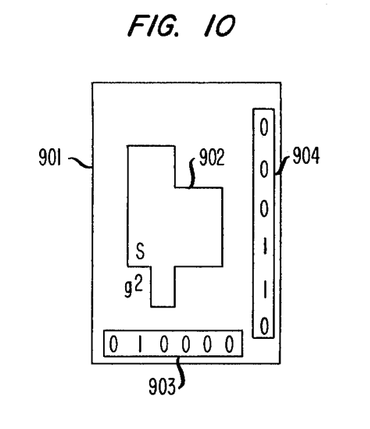
Figure 11:
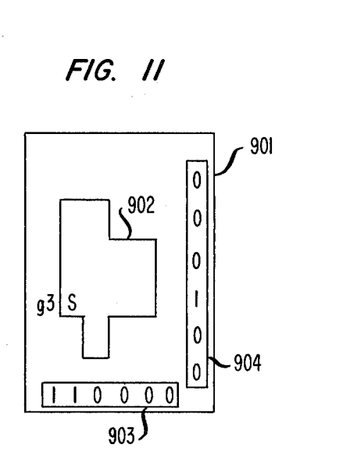
Figure 12:
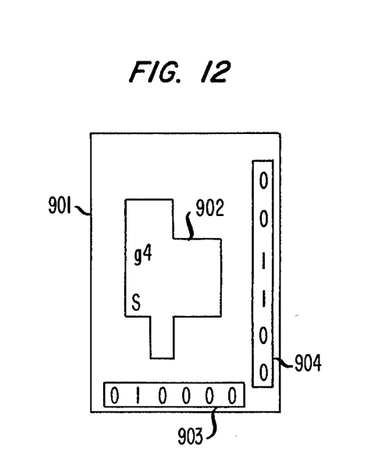

The process just discussed is repeated after extending or contracting one of the previous mask values. The directions (up/down, left/right) in which the X and Y masks are extended (which determine the directions in which each stroke is "grown") depend upon the states of the picture elements which neighbor the seed pel, as shown in FIGS. 9-12. In these drawings, outlined area 901 represents a portion of the picture stored in memory 801 of FIG. 8, and area 902 represents a group of contiguous pels having similar attributes (e.g., all in the "on" state). Assuming that the pel labeled "S" has been determined to be a seed pel, the neighboring pels labeled g1 through g4 in FIGS. 9-12 which are located to the right, below, to the left and above the seed pel, respectively, are tested to determine their status. This is done by starting with the X and Y masks 903 and 904 respectively which indicate the position of the seed pel:

X=010000 and
Y=0001000 and by extending one mask in one direction for each of four tests. For example, in FIG. 9, the X mask 903 is extended right, so (X=011000). The 2×1 stroke defined by the intersection of the X and Y masks includes pels S and g1, both of which are "on", indicating that "to the right" is a valid growth direction. In FIG. 10, the Y mask 904 is grown downward (Y=000110), and the 1×2 stroke defined by the intersection of the X and Y masks is invalid since "g2" is "off". Thus, downward growth is not appropriate. The masks for FIGS. 11 and 12 are shown along the edges of those figures, and "g3" is "off" in FIG. 11 but "g4" is "on" in FIG. 12. The second appropriate growth direction is thus "up". Note that if the seed pel had been in the location specified by S' in FIG. 9, the valid growth directions would be left and down.

Figure 13:
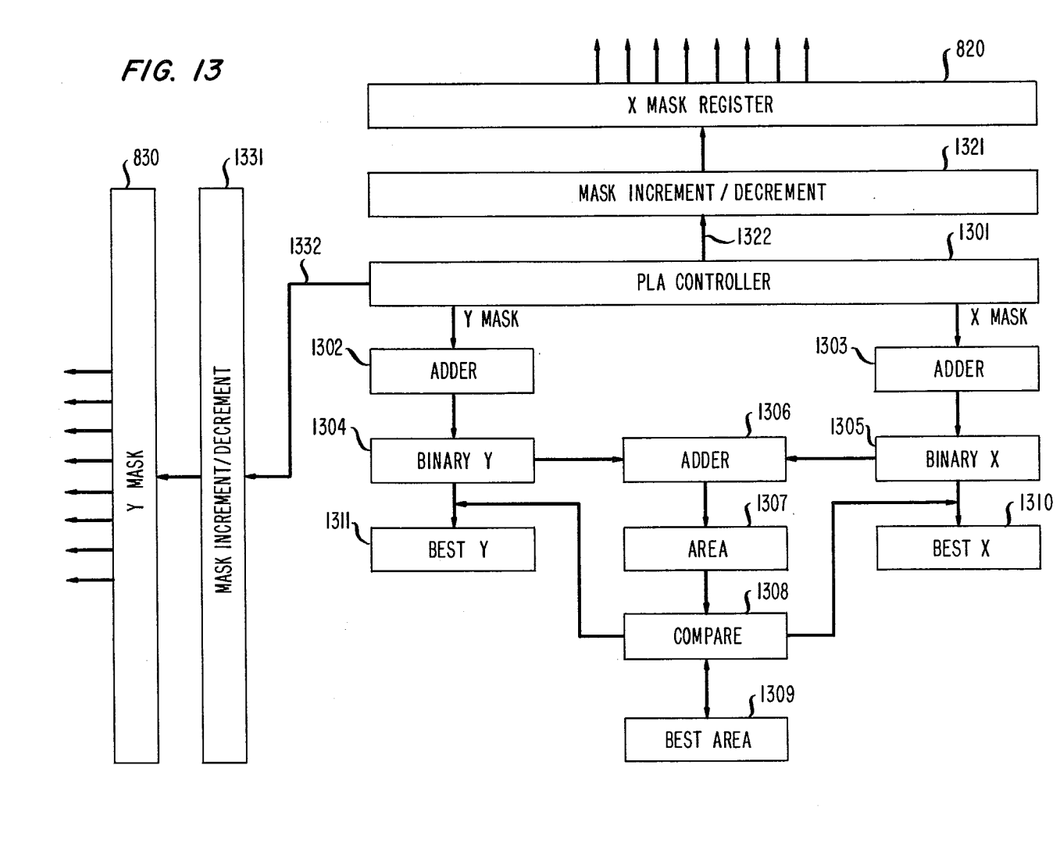
FIG. 13 is a block diagram of driver apparatus arranged to generate masks used in the feature extraction apparatus of FIG. 8.

FIG. 13 is a block diagram of driver apparatus arranged to generate the X and Y mask values used in conjunction with the stroke extraction apparatus of FIG. 8. The driver includes a programmed logic array (PLA) 1301 which implements the logic flow diagram illustrated in FIG. 14, discussed below. The X and Y mask values are formed using mask increment/decrement circuits 1321 and 1331, respectively, which receive inputs from PLA 1301 on lines 1322 and 1332. The inputs indicate whether the mask should be incremented— or decremented, and in which direction the change should be made. Circuits 1321 and 1331 may include two shift registers and a series of AND/OR gates. A mask value is incremented by a shift command, followed by an OR operation of the previous mask value with the shifted version; the shift may be left or right, allowing growth in either direction. Similarly, a mask value is decremented by a shift (left or right) followed by and AND operation on the previous mask value with the shifted version. This provides for "shortening" of the mask from either end.

Increment and decrement signals generated by PLA 1301 for the Y mask and X mask values are also applied to adders 1302 and 1303, respectively, which control a binary form count of the number of mask value "1's" stored in registers 1304 and 1305 respectively. Register 1304 thus contains an indication of the height of the stroke being tested, while register 1305 contains an indication of its width. Adder 1306 receives inputs from both registers 1304 and 1305 and maintains a tally of the "area" (width times height) of the stroke. A multiplier is not required for the area computation, since both the X and Y masks are incremented or decremented by one. For each decrement (increment) of X, the current value of Y is subtracted (added) by adder 1306 from (to) the total stored in area register 1307, while for each decrement (increment) of Y, the current value of X is subtracted from (added to) register 1307. When a success signal is received via line 841 indicating a valid stroke, its area is compared in comparator 1308 with the "best area" value stored in register 1309. If the new area is larger, it replaces the value stored in register 1309, and the "best" X and Y values are concurrently entered in registers 1310 and 1311, respectively. When all of the valid strokes for a particular seed pel have been found, (using the process described below) the "best" X and Y values may then be used to represent the stroke with the largest area. The next seed pel may be processed in a similar fashion.

Figure 14:
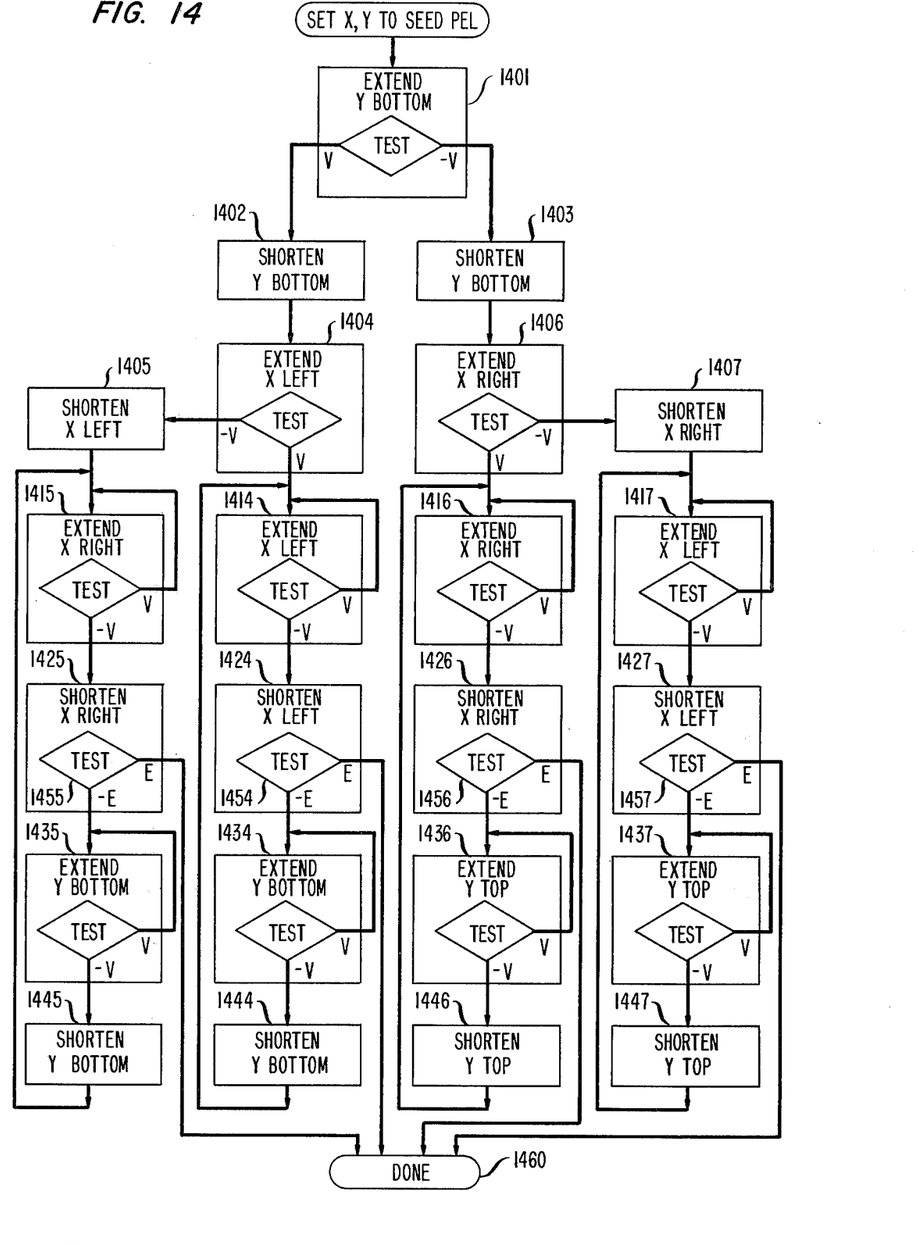
FIG. 14 is a state diagram describing the process used in the apparatus of FIG. 13.

A state or logic flow diagram illustrating the process followed by PLA 1301 (which may be a microprocessor) to generating the X mask and Y mask values used in the stroke extraction apparatus of FIG. 8 is shown in FIG. 14. It is assumed that the X and Y masks are initially set (each with a single "1" bit) to indicate the location of a seed pel. It is also assumed that the contents of registers 1304, 1305, 1307 and 1309 are all set to "1".

The initial steps (1401-1407) in the process illustrated in FIG. 14 determine the appropriate stroke growth directions in a manner similar to that explained previously in conjunction with FIGS. 9-12. In the first step (1401) labelled "extend Y bottom" the Y mask (initially consisting of a single "1") is modified by addition of a second "1" which in effect extends the hypothesized stroke downward by one row as shown in FIG. 10. Step 1401 includes a test to determine if the 1×2 area designated by the original X mask and the new Y mask includes a valid stroke. Thus, if the pels S and g2 shown in FIG. 10 are both "on", a valid (v) result is obtained. The Y mask is then "shortened" (i.e., returned to a single "1" bit) in step 1402. On the other hand, if pel "g" is "off", the stroke is invalid (v̄). The Y mask is also returned to its original value in step 1403.

Following step 1402, the next step (1404) modifies the X mask to extend the picture area being tested to include the pel g3 immediately to the left of the seed pel, as shown in FIG. 11. Step 1404 also includes a test to determine stroke validity; if both pels S and g3 are "on", the process proceeds to step 1414. If not valid (pel g3 is "off") the process continues with step 1405, in which the X mask is returned to its original value.

Figure 9:
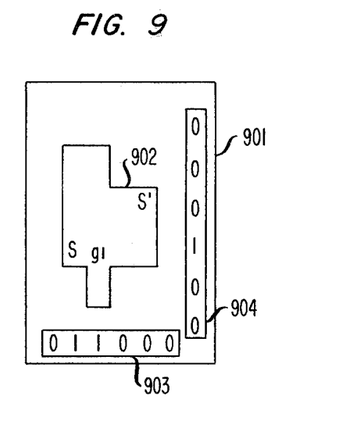
FIGS. 9, 10, 11 and 12 illustrate a portion of an image as may be stored in memory 801 of FIG. 8, showing how the direction of growth from a "seed" picture element may be determined.

Following step 1403, the X mask is modified (step 1406) to extend the test area one pel to the right of the seed pel, as shown in FIG. 9. The 2×1 hypothesized stroke is then tested. If valid, the process continues in step 1416; if invalid, (pel g1 is "off") the X mask is returned to its original value (in step 1407) and the process continues with step 1417. It is again to be noted that steps 1401-1407 together determine which directions of growth (starting with the seed pel) are valid, in the manner explained in conjunction with FIGS. 9-12. Once the directions are determined, the process continues along one branch of FIG. 14. For example, if the growth direction is down and to the left, the process continues with steps 1414, 1424, 1434. . . , following step 1404. Similarly, if upward growth to the right is valid, the process continues with steps 1416, 1426 . . . following step 1406.

The remaining steps in the process depicted in FIG. 14 grow the hypothesized stroke in the appropriate directions, test each hypothesis using a group of pels at a time, and form the next hypothesis based on the results from the previous test. For purposes of explanation, the process shown following steps 1406 will be described, since it reflects the conditions shown in picture area 902 of FIGS. 9-12, i.e., that the stroke should be grown upward and to the right for this example. The remaining processes in the other three branches of FIG. 14 follows a similar pattern of steps.

In step 1416, the X mask is extended to the right and the newly hypothesized stroke is tested to determine whether all of the pels specified by the original Y mask and the new X mask are "on". If so, step 1416 is repeated, again extending the X mask to the right. If not, the X mask is shortened on the right (step 1426) to return it to the previous value. Step 1426 includes a test step 1456 to determine if the X mask is empty. If it is, every possible stroke which includes the seed pel being processed has been tested, and a "done" signal is generated in step 1460. If the X mask still contains one or more "1's", the process continues with step 1436, in which the Y mask is extended upward. After upward growth, the hypothesized stroke area, specified by the X and Y masks, is again tested, and if valid, step 1436 is repeated by extending the Y mask yet again. Otherwise, the Y mask is shortened back to its last valid size and the X mask is again shortened on the right in step 1446, whereupon step 1426 is repeated.

The process performed in steps 1416, 1426, 1436 and 1446 identifies and tests the validity of all of the strokes which include the original seed pel; the stroke with the largest area is determined by comparator 1308, which compares the area of each valid stroke with the best area so far. As noted previously, the process followed in steps 1415, 1425 . . . , steps 1414, 1424 . . . , and steps 1417, 1427 . . . are identical to those just described with respect to steps 1416, 1426 . . . , except that the directions of stroke growth are different.

Figure 15:
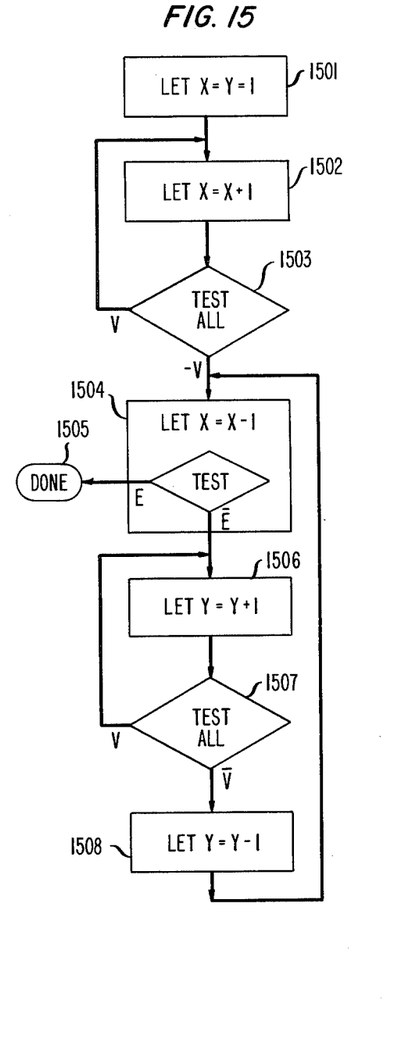
FIGS. 15 and 16 are state diagrams comparing the process of the present invention to a technique which tests one picture element at a time.
Figure 16:
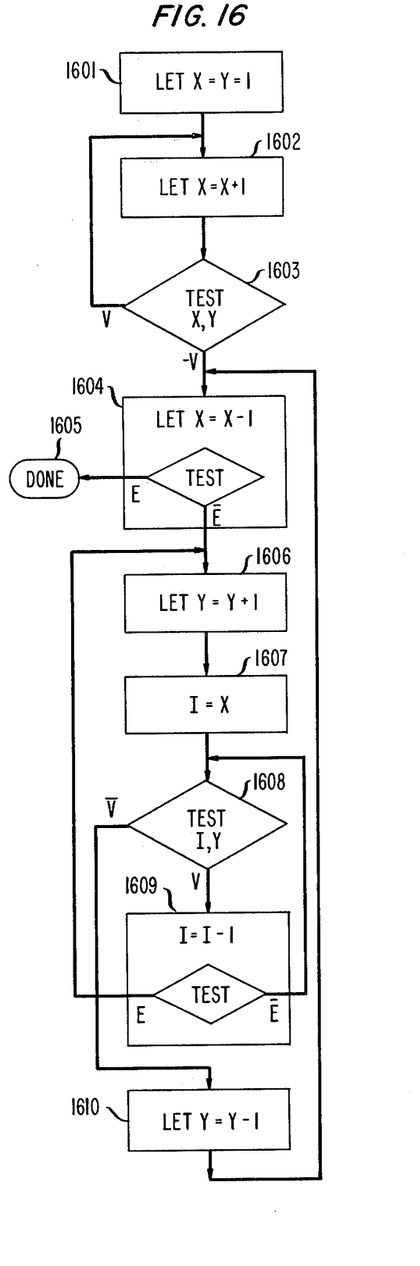

The advantages of the stroke extraction process just described will be better appreciated by comparing FIGS. 15 and 16. FIG. 15 illustrates the stroke extraction steps followed in accordance with the present invention, including testing of the pels in a hypothesized stroke as a group. FIG. 16 illustrates a stroke extraction process which tests pels individually. The process shown in FIG. 15 is essentially similar to any of the branches (such as 1416, 1426 . . . , of FIG. 14), but certain simplifications have been made. In FIG. 15, the initial values of the X and Y masks (single "1's") are set based on the seed pel location, in step 1501. The X mask is then extended by one in step 1502, it being assumed that the extension occurs in the appropriate direction. In step 1503, all of the picture elements in the portion of the picture specified by the X and Y masks are tested, in the manner described in conjunction with the apparatus of FIG. 8. If all such pels are "on", a valid stroke is indicated, and step 1502 is repeated. If an invalid result occurs, the X mask is restored to its immediately preceding value in step 1504. At this point, if the X mask is empty, all strokes which include the present seed pel have been tested and the process is "done" as shown in step 1505. If not, the Y mask is increased by one in step 1506, it again being assumed that extension occurs in the appropriate direction. All pels within the hypothesized stroke area are then tested in step 1507. A valid result causes a return to step 1506, while an invalid result decrements the Y mask by one in step 1508, whereupon the process returns to step 1504.

Inspection in FIG. 15 indicates a single loop exists from step 1508 back to step 1504, and that the process is both simple and efficient. By way of comparison, the process shown in FIG. 16 includes two nested loops, and is thus considerably more complicated.

Referring to FIG. 16, the X and Y variables are each initially set (step 1601) to indicate the location of the seed pel. The X value is then increased by one in step 1602. Step 1603 tests the single picture element last added to the hypothesized stroke, i.e., the pel specified by the present values of X and Y. All of the pels within the stroke region are not tested, as in the present invention. If the test result is positive, step 1602 is repeated by further indexing the value of X. Otherwise, the X value is restored to its prior value in step 1604. At this point, if the value of X is zero, the process is completed (step 1605). Otherwise, the process continues in step 1606 where the Y value is increased by one.

Since pels are tested individually in the process of FIG. 16, an intermediate variable I is set to the value of X in step 1607. The pel at location I,Y is tested in step 1608. If a valid result is indicated (pel is "on"), step 1609 is performed in which the value of I is reduced by one to test the remaining pels in the newly designated row of the picture area being processed. If the result of the test in step 1608 is invalid (pel "off"), step 1610 reduces the Y value by one and step 1604 is repeated for a decremented X value. When the value of I has been reduced to zero, this too is detected in step 1609, causing the process to return to step 1606, so that the next row may be processed.

Figure 17:
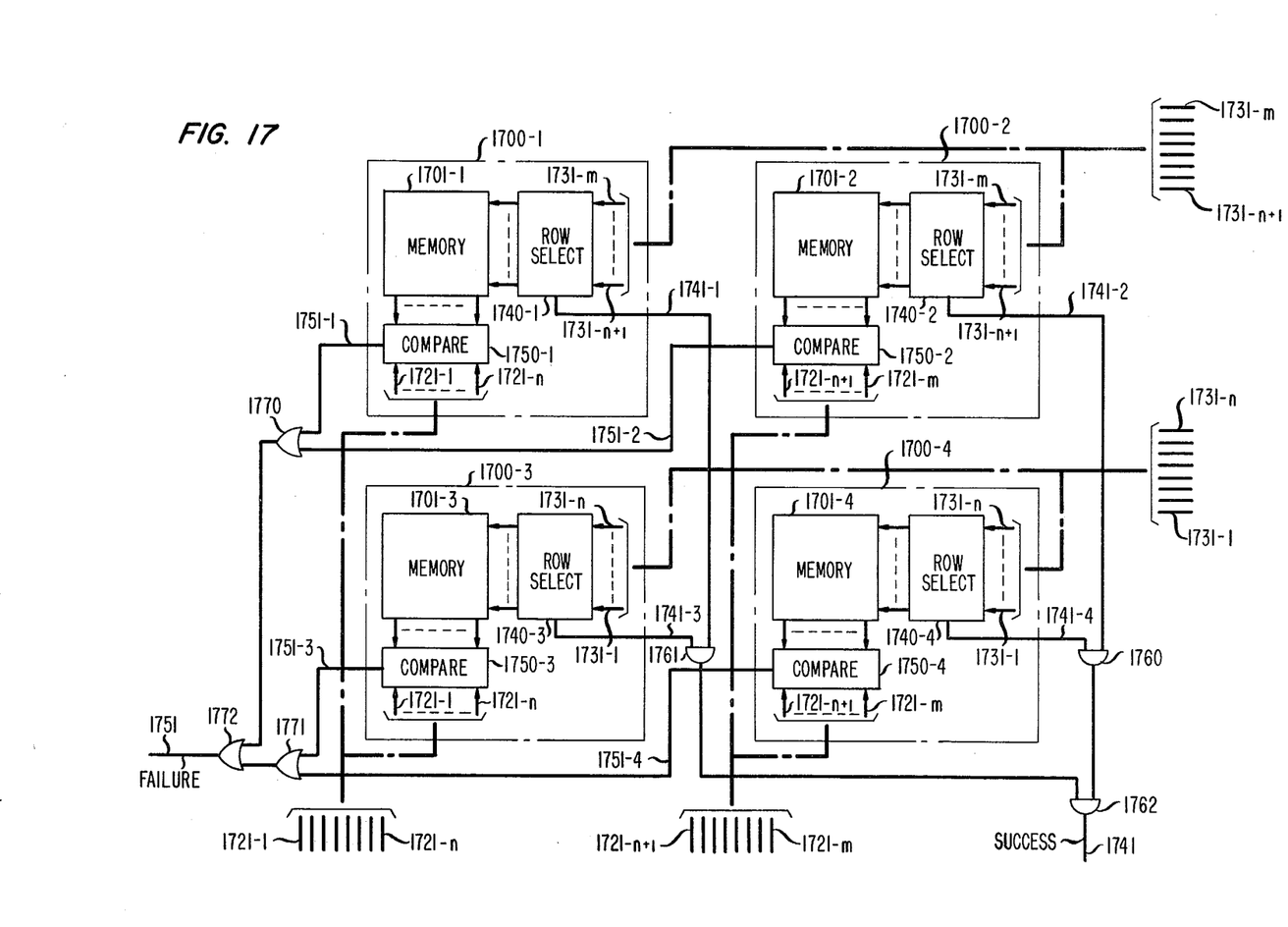
FIG. 17 illustrates the combination of several stroke extraction modules.

When it is desired to examine a portion of a picture which is larger than that which can conveniently fit in a single memory (such as memory 801 of FIG. 8), several memory devices may be combined using the arrangement shown in FIG. 17. Advantageously, in accordance with the present invention, such an arrangement utilizes several identical modules 1700-1, 1700-2, 1700-3 and 1700-4 which are interconnected using logic circuits described below. The modules operate in parallel, so that the time needed to process the entire picture is no longer than that needed to process the single picture region stored in memory 801 of FIG. 8.

Each of the modules, such as module 1700-1, includes a memory 1701-1, row select logic 1740-1 and a multibit comparator 1750-1, each of which corresponds in function to a similar component in FIG. 8. Each module also include registers (not shown) similar to registers 820 and 830 in FIG. 8 which receive X mask and Y mask inputs, respectively, indicating the picture region to be tested to determine the existence of a valid stroke. The X mask information for the entire picture portion stored in memories 1701-1 through 1701-4 is input on lines 1721-1 through 1721-n and lines 1721-n+1 through 1721-m, while the Y mask information for the entire picture portion is input via lines 1731-1 through 1731-n and lines 1731-n+1 through 1731-m. The modules are arranged in a rectilinear array, such that modules in the same row share the same Y mask inputs while modules in the same column share the same X mask inputs. FIG. 17 illustrates a 2×2 module array (other arrangements are possible) in which module 1700-1 processes the upper-left quadrant of the picture portion and the remaining modules each process a different quadrant.

Operation of each module is similar to that described with respect to FIG. 8. In module 1700-1, information describing the attributes of each picture element is loaded in the memory by apparatus not shown, and the "1's" in the Y mask are then used in row select logic 1740-1 to apply corresponding rows of picture information stored in memory 1701-1 to first inputs of comparator 1750-1. The second inputs to the comparator are the X mask values for that quadrant, input on lines 1721-1 through 1721-n. If any of the X mask values is not matched by the picture information read from memory 1701-1, a failure signal is generated on line 1751-1. This signal is coupled through logic including OR gates 1770 and 1772 to "failure" output line 1751. On the other hand, if the picture row tested does match the X mask, the just used "1" in the Y mask is reset to "0" and the next "1" bit is used to select a succeeding row from memory 1701-1 for testing. When the contents of row select logic 1740-1 is all "0's" indicating that all appropriate rows have been tested, a success signal is generated on line 1741-1 and this is coupled to "success" line 1741 via logic including AND gates 1761 and 1762. The remaining modules in the apparatus of FIG. 17 simultaneously operate in a like manner to test the portions of the picture stored in the other memories 1701-2, 1701-3 and 1701-4. Each of these modules includes its own row select logic 1740-1, -2, -3 and -4, and comparators 1750-1, -2, -3 and -4. The failure signal generated by the comparators in each module are OR'ed together using OR gates 1770, 1771 and 1772, such that a failure in any module produces a failure on the output line 1751. On the other hand, the succes outputs from the row select logic in each of the modules are AND'ed together in AND gates 1760, 1761 and 1762 so that all must be successful for the output on line 1741 to be high.

Figure 18:
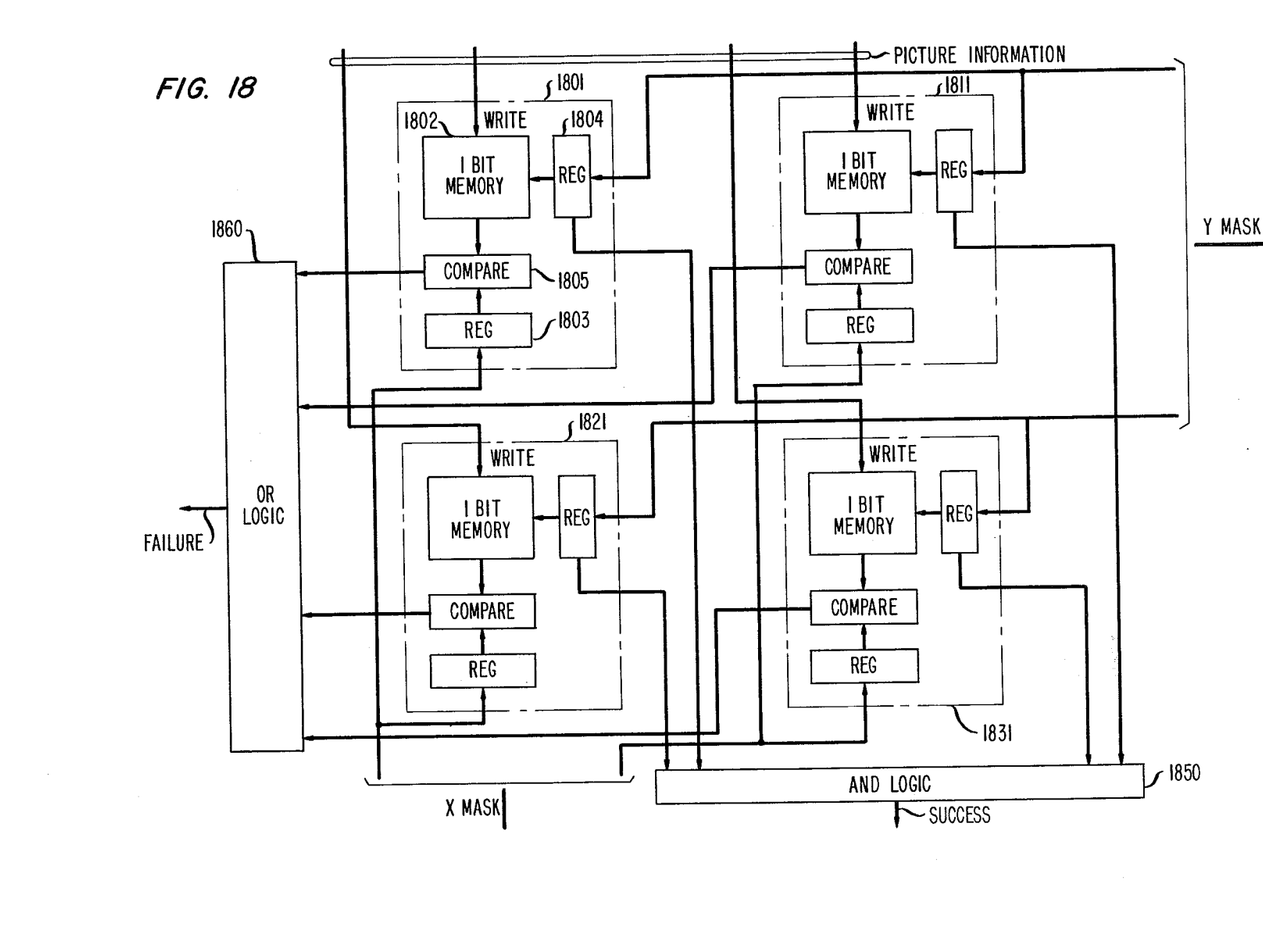
FIG. 18 illustrates an arrangement in which each module tests a single picture element in accordance with externally generated mask information.

While the arrangement of FIG. 17 is useful in expanding the area of the picture which may be examined to determine the existence of strokes, parallel processing can also be used advantageously where each module is compressed to include storage and test capability for only a few pels or even a single picture element. This arrangement is illustrated in FIG. 18. Each module, such as module 1801, includes a one bit memory 1802 and one bit registers 1803 and 1804 for receiving the X and Y mask inputs. If the Y mask is a "1", a success signal is generated by comparator 1805 if the bit in memory 1802 indicates an "on" pel and a failure signal is generated if the bit is "off". The success signals from other modules (1811, 1821 . . . ) are AND'ed together, while the failure signals are OR'ed together in a series of logic elements 1850 and 1860, respectively. The memory elements in each module are loaded by apparatus not shown, and the mask inputs are manipulated as explained previously. This arrangement enables completely parallel processing in which the entire picture, no matter how large, may be processed at one time.

The various adaptations and modifications of the present invention will be apparent to those skilled in the art. Accordingly, it is intended that the scope of the invention be limited only by the appended claims.

What is claimed is:

1. A method of representing the features of a portion of a picture by one or more strokes, said picture including a rectilinear array of picture elements, each of said strokes including a contiguous group of picture elements having similar attributes, including the steps of:
   (a) hypothesizing the existence of a stroke including a beginning pel and at least one additional pel;
   (b) simultaneously testing a group of at least two pels contained in the hypothesized stroke defined in step (a) to generate a success indication if all of the pels in said group possess similar attributes; and
   (c) repeating step (a) for other hypothesized strokes.

2. The method defined in claim 1 wherein said array of picture elements defines a plurality of rows and columns, and said group of at least two pels lies along one of said rows or columns.

3. The method defined in claim 2 wherein said hypothesizing step includes generating an X mask word having a number of bits equal to the number of said columns in said array and a Y mask word having a number of bits equal to the number of said rows in said array, and wherein the location of "1" bits in said masks indicate the position of said hypothesized stroke.

4. The method defined in claim 3 wherein said repeating step includes changing the value of said X or Y mask words.

5. The method defined in claim 4 wherein said changing step includes:
   (1) extending said X mask word to include an additional "1" bit if said success indication is generated, and
   (2) shortening said X mask word to include one fewer "1" bits if said success indication is not generated.

6. The method defined in claim 5 wherein said testing step includes comparing said X mask word with picture elements in selected rows of said array, said rows being selected as a function of said Y mask word.

7. A method of representing the attributes of a portion of a picture by one or more strokes, said picture including a rectilinear array of picture elements, each of said strokes including a contiguous group of picture elements having similar attributes, including the steps of:
   (a) locating a beginning pel for each stroke;
   (b) defining said stroke to include one or more additional or one or more fewer pels;
   (c) testing groups of pels contained in the stroke defined in step (b) to generate an indication if all of said pels in said group possess similar attributes; and
   (d) repeating step (b) until all strokes including said beginning pel have been tested.

8. The method defined in claim 7 wherein said defining step includes:
   (1) increasing the width of said stroke until said indication is not obtained;
   (2) increasing the height of said stroke until said indication is not obtained;
   (3) decreasing the width of said stroke by one pel; and
   (4) repeating step (2) unless said width in step (3) is zero.

9. A method of processing a picture comprising an array of picture elements arranged in rows and columns to extract one or more strokes, each of said strokes including a contiguous group of picture elements having similar visual attributes, said processing method including the steps of;
   (a) hypothesizing the existence of a stroke;
   (b) testing on a line-by-line basis pels contained in the hypothesized stroke defined in step (a) to generate a success indication if all of the pels possess similar attributes; and
   (c) repeating step (b) for other hypothesized strokes.

10. Apparatus for processing a portion of a picture comprising an array of picture elements (pels) to extract a stroke defining a contiguous group of pels having similar visual attributes, said apparatus including:
   means for generating X mask and Y mask code words which indicate rows and columns, respectively, of said picture portion in which a hypothesized stroke may reside,
   means responsive to said last mentioned means for simultaneously testing selected pels in said picture portion to indicate if said selected pels have similar attributes, and
   means responsive to said indication for modifying said mask code words.

11. The invention defined in claim 10 wherein said mask code word generating means is arranged to locate a seed pel which forms a corner of said hypothesized stroke, and said mask code word modifying means is arranged to extend said hypothesized stroke to include the maximum number of pels with similar visual attributes.

12. The invention defined in claim 11 wherein said testing means is arranged to select said pels row by row, as a function of said Y mask code word, and to simultaneously test ones of the pels in said selected rows as a function of said X mask code word.

13. Apparatus for identifying regions in a picture array having similar visual characteristics, comprising:
    memory means for storing said picture array such that selected rows of picture elements may be accessed,
    program controlled logic means for generating X and Y mask code words indicating a region to be tested, and
    means for accessing and testing pels in the regions indicated by said mask code words,
    wherein said last mentioned means is arranged to: (1) sequentially access rows in said stored picture array in accordance with said Y mask code word, and
    (2) for each accessed row, simultaneously test selected pels in accordance with said X mask code word.

14. The invention defined in claim 13 wherein said program controlled logic means is arranged to:
    (1) form initial X and Y mask code words indicating the location of a corner of said region, and
    (2) extend said region in response to an output derived from said accessing and testing means.

15. A method of identifying regions with similar visual characteristics in portions of pictures, said picture portions including an array of picture elements (pels), including the steps of:
    hypothesizing the existence of a region including a plurality of pels with similar characteristics,
    testing the pels in said region to determine if said pels have similar characteristics, and
    changing the boundaries of said region in response to the result of said last mentioned testing step,
    wherein said testing step includes:
    generating first and second mask words indicating the row and column locations indicative of said region, and
    simultaneously testing all pels indicated by said first mask word in a row of said region indicated by said second mask word.

* * * * *